(12) United States Patent
Koyama (10) Patent No.: US 7,608,304 B2
(45) Date of Patent: Oct. 27, 2009

(54) SUBSTRATE CARRYING METHOD AND SUBSTRATE CARRYING APPARATUS

(75) Inventor: Minoru Koyama, Matsumoto (JP)

(73) Assignee: Seiko Epson Corporation (JP)

( * ) Notice: Subject to any disclaimer, the term of this patent is extended or adjusted under 35 U.S.C. 154(b) by 409 days.

(21) Appl. No.: 11/353,457

(22) Filed: Feb. 14, 2006

(65) Prior Publication Data

US 2006/0204870 A1 Sep. 14, 2006

(30) Foreign Application Priority Data

Mar. 8, 2005 (JP) ............................. 2005-063484

(51) Int. Cl.
*B05D 7/00* (2006.01)
*B65G 13/00* (2006.01)
*C23C 30/00* (2006.01)

(52) U.S. Cl. .................. 427/421.1; 198/691; 198/860.1; 198/860.3; 361/1; 361/42; 193/37; 118/72; 118/73; 427/58; 427/96.1; 427/123; 427/162; 427/164; 427/165; 427/427.1; 427/428.01

(58) Field of Classification Search ................ 430/48; 427/428.01; 399/3
See application file for complete search history.

(56) References Cited

U.S. PATENT DOCUMENTS

| | | | | |
|---|---|---|---|---|
| 3,717,791 A | * | 2/1973 | Heyl et al. .................. | 361/212 |
| 4,967,259 A | * | 10/1990 | Takagi ......................... | 257/620 |
| 5,776,554 A | * | 7/1998 | Merritt et al. ................ | 427/478 |
| 6,981,761 B2 | * | 1/2006 | Usui et al. ..................... | 347/85 |
| 7,220,922 B2 | * | 5/2007 | Nishino et al. .............. | 174/261 |
| 2005/0064091 A1 | | 3/2005 | Yamazaki | |
| 2005/0106901 A1 | * | 5/2005 | Chen ........................... | 439/64 |
| 2005/0112906 A1 | * | 5/2005 | Maekawa et al. ........... | 438/795 |

FOREIGN PATENT DOCUMENTS

| | | |
|---|---|---|
| JP | 02-310531 | 12/1990 |
| JP | 06-250162 | 9/1994 |
| JP | 07-172572 | 7/1995 |
| JP | 10-133229 | 5/1998 |
| JP | 11-233599 | 8/1999 |
| JP | 2001-176946 | 6/2001 |
| JP | 2002-274642 | 9/2002 |
| JP | 2002274642 A * | 9/2002 |
| JP | 2003-332403 | 11/2003 |
| WO | WO2004/070821 A1 | 8/2004 |

* cited by examiner

*Primary Examiner*—Timothy H Meeks
*Assistant Examiner*—Alexander Weddle
(74) *Attorney, Agent, or Firm*—Harness, Dickey & Pierce, P.L.C.

(57) ABSTRACT

A substrate carrying method for removing the electrical charges on a substrate and then carrying the substrate includes forming a conductive layer with conductivity on a part of the surface of the substrate, and carrying the substrate while supporting a conductive layer-forming region of the substrate by a grounded substrate supporting unit with conductivity.

8 Claims, 6 Drawing Sheets

SUBSTRATE CARRYING METHOD AND SUBSTRATE CARRYING APPARATUS

BACKGROUND

1. Technical Field

The present invention relates to a substrate carrying method and a substrate carrying apparatus.

2. Related Art

In case that an active matrix type liquid crystal panel driving the liquid crystal as a switching element such as a liquid crystal panel, particularly TFT is manufactured, the manufacturing apparatus of the liquid crystal panel has been improved to obtain the enhancement of yield or quality. Here, specifically, since a static electricity is generated by the electrical charging of the liquid panel in the manufacturing process, there is a problem that elements such as TFT is destructed, dust in the air is adsorbed, and thus yield or quality is decreased. Recently, a glass substrate for manufacturing a liquid crystal panel grows in size, and thus total amount of the glass substrate as an insulator is increased. Therefore, the problem has become serious.

When the glass substrate is carried, the technology supporting the glass substrate by the grounded conducting member is disclosed to prevent the glass substrate from the electrical charging in the manufacturing process. (for example, see JP-A-10-133229) In the technology of the JP-A-10-133229, it is not sufficient to prevent the glass substrate recently growing in size from the electrical charging.

SUMMARY

An advantage of some aspects of the invention is that it provides a substrate carrying method and a substrate carrying apparatus which can surely prevent a glass substrate from the electrical charging when the glass substrate is carried.

According to an aspect of the invention, there is provided the substrate carrying method for removing electrical charges on the substrate and then carrying the substrate, including: forming a conductive layer with conductivity on a part of the surface of the substrate; and carrying the substrate while supporting a conductive layer-forming region of the substrate by a grounded substrate supporting unit with conductivity.

By this configuration, even if the substrate during the carriage becomes electrically charged, it can be prevented that the substrate is charged with electricity since the charge is quickly lost through the conductive layer and the substrate supporting unit. Accordingly, since problems caused by the electrical charges on the substrate, for example, the destruction of TFT elements or absorption of dust in the air can be prevented, the yield and quality of the product can be improved. Especially, since the substrate supporting unit comes in contact with the conductive layer and the whole conductive layer is grounded, large area is grounded. Therefore, since good effectiveness to remove the electrical charges is expected and further electrical charging on the substrate can be surely prevented, the above-referenced effects can be obtained on any condition.

According to an aspect of the substrate carrying method of the invention, it is preferable that the conductive layer is formed by applying the liquid material on the substrate using a droplet discharging head that discharges the liquid material with conductive particles as droplets, and then by solidifying or hardening the liquid material. Accordingly, the conductive layer can be accurately and easily formed in a desired pattern. Furthermore, the conductive layer is formed with a little waste of materials at low cost.

According to an aspect of the substrate carrying method of the invention, it is preferable that the substrate supporting unit is constituted by a roller that transfers the substrate by the rolling. By this configuration, the substrate can be smoothly transferred by the substrate supporting unit in the simple structure. According to another aspect of the substrate carrying method of the invention, it is preferable that the substrate supporting unit is constituted by an attaching part that attaches on the substrate by vacuum. By this configuration, the substrate can be transferred with being firmly held. According to a further aspect of the substrate carrying method of the invention, it is preferable that the substrate supporting unit is constituted by a guide rail that guides the substrate. By this configuration, the structure of substrate supporting unit can be significantly simplified. According to a still further aspect of the substrate carrying method of the invention, it is preferable that the conductive layer is formed in a strip shape along the carrying direction of the substrate. By this configuration, greater effects of removing the electrical charges can be obtained because the contact between the conductive layer and the substrate supporting unit can be certainly kept even if the substrate moves to the carrying direction.

According to an aspect of the substrate carrying method of the invention, the substrate is to be cut into a plural of pieces in the post-process, and it is preferable that the conductive layer is formed to include a cutting line along which the substrate is cut into pieces. By this configuration, since the conductive layer is located on the edges of the divided substrate after the substrate is cut into pieces, the conductive layer is not shown, and thus undesirable effects caused by the conductive layer can be restrained.

The substrate carrying apparatus of an aspect of the invention is the substrate carrying apparatus for removing the electrical charges on a substrate and then carrying the substrate, comprising: a grounded substrate supporting unit with conductivity, wherein a conductive layer with conductivity is formed on a part of the surface of the substrate, and the substrate is carried while the conductive layer-forming region of the substrate is supported by the substrate supporting unit.

By this configuration, even if a substrate during the carriage becomes electrically charged, it can be prevented that the substrate is charged with electricity since the charge is quickly lost through the conductive layer and the substrate supporting unit. Accordingly, since problems caused by the electrical charges on the substrate, for example, the destruction of TFT elements or absorption of dust in the air can be prevented, the yield and quality of the product can be improved. Especially, since the substrate supporting unit comes in contact with the conductive layer and the whole conductive layer is grounded, large area is grounded. Therefore, since good effectiveness to remove the electrical charges is expected and further electrical charging on the substrate can be surely prevented, the above-referenced effects can be obtained on any condition.

According to the substrate carrying apparatus of an aspect of the invention, it is preferable that the substrate supporting unit is constituted by a roller that transfers the substrate by rolling. By this configuration, the substrate can be smoothly transferred by the substrate supporting unit in the simple structure. According to the substrate carrying apparatus of another aspect of the invention, it is preferable that the substrate supporting unit is constituted by an attaching part that attaches on the substrate by vacuum. By this configuration, the substrate can be transferred with being firmly held. According to the substrate carrying apparatus of a further aspect of the invention, it is preferable that the substrate supporting unit is constituted by a guide rail that guides the substrate. By this configuration, the structure of substrate supporting unit can be significantly simplified.

DESCRIPTION OF EXEMPLARY EMBODIMENTS

Hereinafter, the substrate carrying method and the substrate carrying apparatus of the invention will be described with reference to embodiments shown in the attached drawings.

First Embodiment

Figure 1:
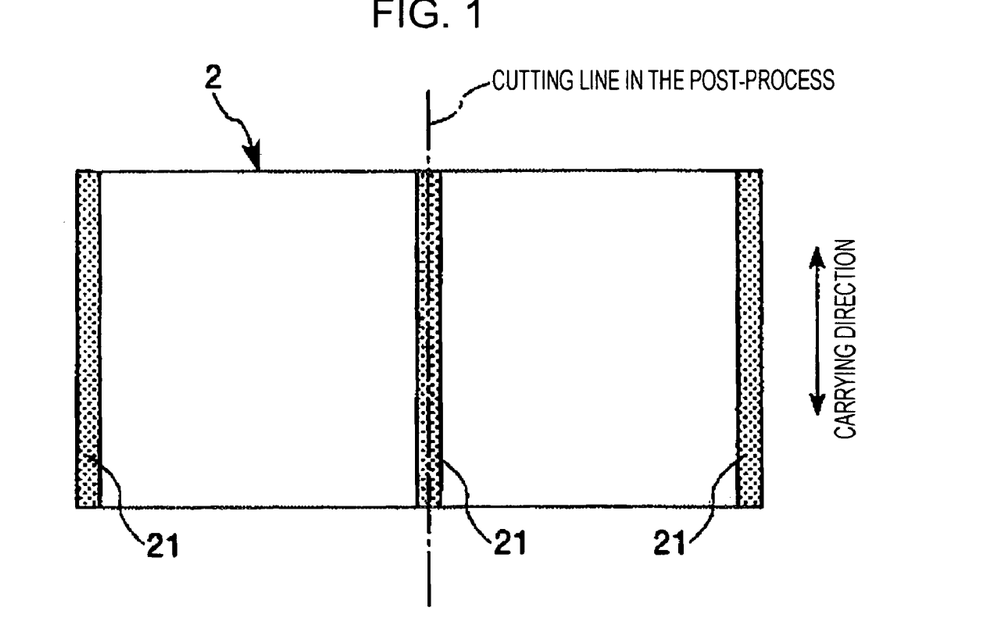
FIG. 1 is a view illustrating the bottom of the substrate when the substrate is carried as a carrying object according to the invention.
Figure 2:
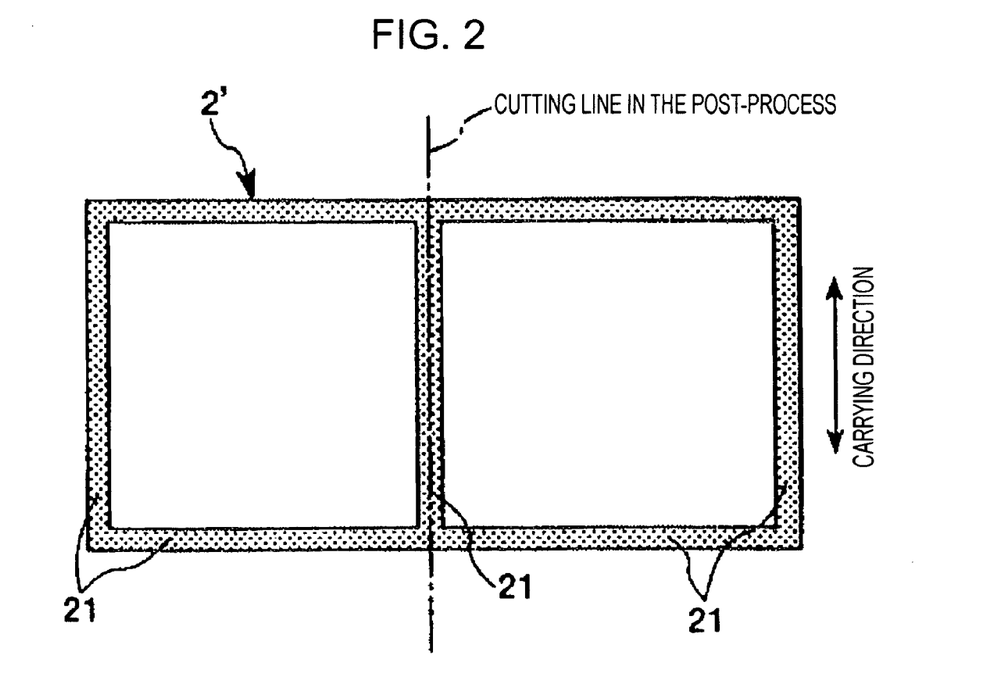
FIG. 2 is a view illustrating another configuration of the substrate which is a carrying object according to the invention.

FIG. 1 is a view illustrating the bottom of the substrate when the substrate is carried as a carrying object according to the invention, and FIG. 2 is a view illustrating another configuration of the substrate which is a carrying object according to the invention. The substrate 2, the carrying object of the invention, is composed of the most part of insulating materials such as glass, plastic and so on. However, a part having conductivity like a circuit may be formed on the surface corresponding to the topside when the substrate 2 is carried.

Although the substrate 2 may be used for any purpose, the substrate 2 of the embodiment is a glass substrate to manufacture a liquid crystal panel.

Two liquid crystal panels for a big television screen are manufactured from the substrate 2. That is, the substrate 2 is cut into two pieces along the cutting line shown by a chain line in FIG. 1 in the process after carried by the substrate carrying method of the invention.

As shown in FIG. 1, prior to the carriage of the substrate 2, the conductive layer 21 with conductivity is formed on the part of the surface corresponding to the bottom side of the substrate 2 which is being carried. Here, in the FIG. 1 and FIG. 2, hatchings are added to show the forming area of the conductive layer 21 for the easy observation. That is, the hatchings in FIG. 1 and FIG. 2 do not indicate the cross-sectional surface. Although the constituent materials may be anything with conductivity, transparent materials like ITO (Indium Tin Oxide), for example, is preferable. By this configuration, it can be prevented that the conductive layer 21 causes a problem when the substrate 2 becomes an end product.

Although the forming position of the conductive layer 21 is not particularly limited, in the embodiment the conductive layer 21 is formed in a strip shape near two edges parallel with the carrying direction of the substrate 2 and in the center position between both edges. As mentioned above, the conductive layer 21 is formed in a strip shape along the carrying direction of the substrate 2, and thereby the contacting condition between the conductive layer 21 and the substrate supporting unit can be surely kept even if the substrate 2 moves on the substrate carrying apparatus 1 to be described later, and thus higher effects removing the electrical charges can be achieved.

Furthermore, the central conductive layer 21 overlaps the cutting line of the substrate 2. As mentioned above, the conductive layer 21 is formed in areas including the cutting line along which the substrate 2 is cut into pieces in the post-process, and thereby the conductive layer 21 is located on the edges of the divided substrate 2 after the substrate is cut into pieces, and thus the conductive layer 21 is not shown and undesirable effects caused by the conductive layer can be restrained.

In the substrate 2 shown in FIG. 1, although the number of the strip-shaped conductive layers 21 in parallel with the carrying direction of the substrate 2 is three, the number is not limited to it. In case of a substrate divided to several pieces such as the substrate for manufacturing of a liquid crystal panel for a cellular phone, there are several cutting lines, and thus the number of the conductive layer 21 can be increased. Furthermore, the conductive layer 21 may be formed toward the vertical direction to the carrying direction such as the substrate 2 shown in FIG. 2.

Figure 3:
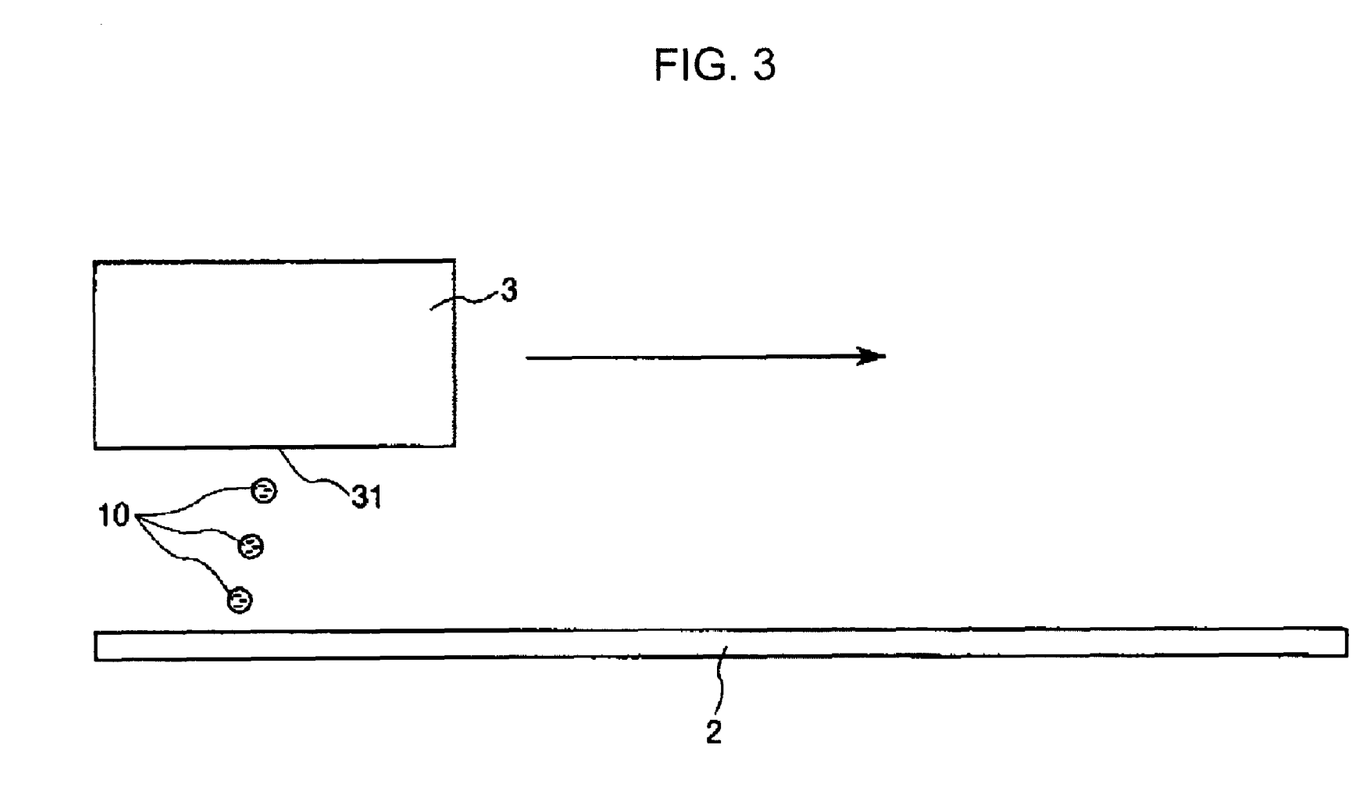
FIG. 3 is a side view explaining the method for forming a conductive layer on a substrate by the ink-jet method.

FIG. 3 is a side view explaining the method for forming a conductive layer 21 on a substrate 2 by the ink-jet method. Hereinafter, an example of the method for forming the conductive layer 21 with reference to FIG. 3. Liquid material (dispersion liquid) which disperses conductive particles composed of conductive materials such as ITO using the dispersion medium is prepared. Next, as the nozzle 31 of the known droplet discharging head (ink jet head) 3 discharges the droplet 10 of the liquid material, the substrate 2 and the droplet discharging head 3 relatively move. Therefore, the conductive layer 21 is drawn on the substrate 2 with the liquid material. Subsequently, the dispersion medium in the liquid material on the substrate 2 is evaporated by drying, and thereby the liquid material of the substrate 2 is solidified and hardened and thus the conductive layer 21 is formed.

When the conductive layer 21 is formed in the above-mentioned ink-jet method, the conductive layer 21 can be accurately and easily formed in a desired pattern. In addition, since the waste of material can be lowered, the conductive layer 21 can be formed at low cost. The forming method of the conductive layer 21 is not limited to the ink-jet method and may be an evaporation coating, an ion plating, and a sputtering method.

Figure 4:
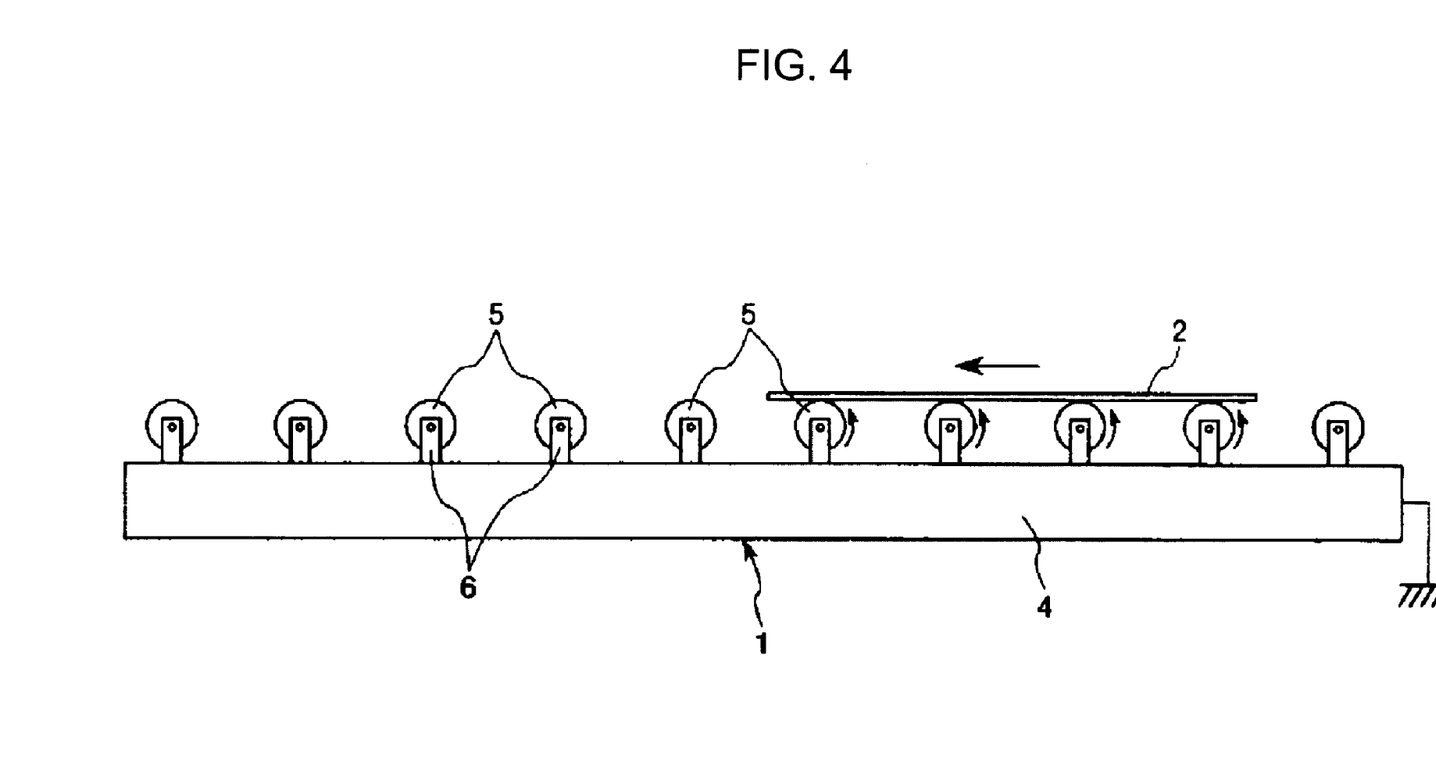
FIG. 4 is a side view illustrating the embodiment of the substrate carrying apparatus that implements the substrate carrying method of the invention.
Figure 5:
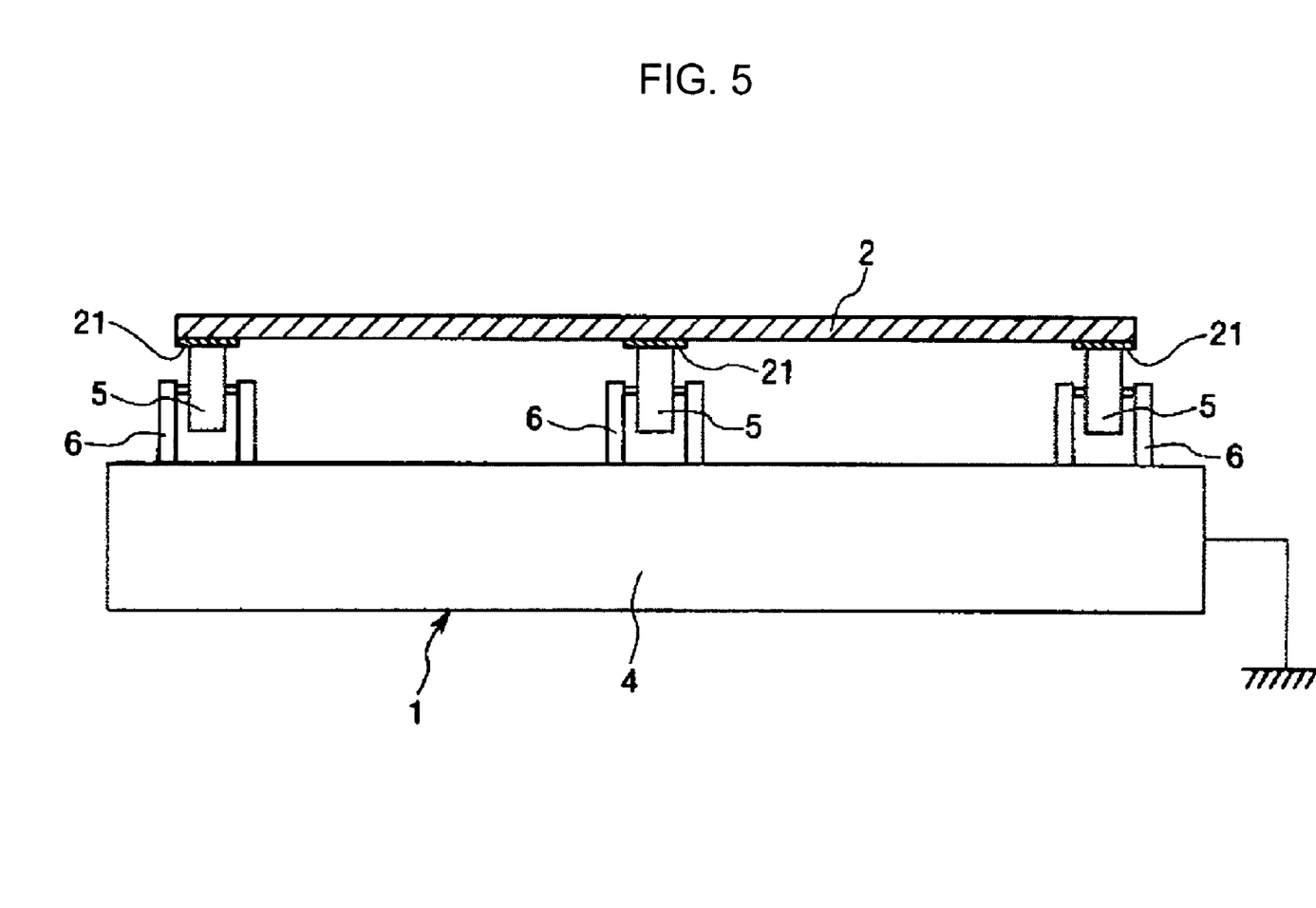
FIG. 5 is a front view illustrating the embodiment of the substrate carrying apparatus that implements the substrate carrying method of the invention.

FIG. 4 and FIG. 5 are a side view and a front view respectively illustrating the embodiment of the substrate carrying apparatus that implements the substrate carrying method of the invention. As shown in FIG. 4, the substrate carrying apparatus 1 has the main body 4 and a number of rollers 5 provided on the main body 4. Each of the rollers 5 is supported to be able to roll by the roller supporting part 6. The substrate 2 is placed on the rollers 5. That is, the substrate supporting unit according to the substrate carrying apparatus is constituted by the rollers 5. The rollers 5 roll by being driven by a motor, which is not illustrated, and thereby the substrate 2 is carried to the left in FIG. 4.

FIG. 5 is a front view illustrating the embodiment of the substrate carrying apparatus 1 that implements the substrate carrying method of the invention. As shown in FIG. 5, the rollers 5 are arranged in three rows, and the rollers 5 of each row respectively support the forming area of the conductive layer 21 on the substrate 2. The main body 4, the roller 5, and the roller supporting part 6 are composed of conductive material such as metal, metal powder, metal compound, carbon black and others, at least in the vicinity of its surface. Besides, the part between the main body 4 and the roller supporting part 6 and the part between the roller supporting part 6 and the rollers 5 are conductive. Moreover, the main body 4 is grounded. By this configuration, the rollers 5 are grounded with the roller supporting part 6 and the main body 4.

According to the substrate carrying apparatus 1 as above, if the substrate 2 during the carriage is charged with electricity, the charge is quickly lost through the conductive layer 21 and the rollers 5, and thus the substrate 2 can be prevented to take electrical charges. Accordingly, since problems caused by the electrical charges on the substrate, for example, the destruction of TFT elements or absorption of dust in the air can be prevented, the yield and quality of the product can be improved. Especially, since the substrate supporting unit comes in contact with the conductive layer and the whole conductive layer is grounded, large area is grounded. Therefore, since good effectiveness to remove the electrical charges is expected and further electrical charging on the substrate can be surely prevented, the above-referenced effects can be obtained on any condition.

Second Embodiment

Figure 6:
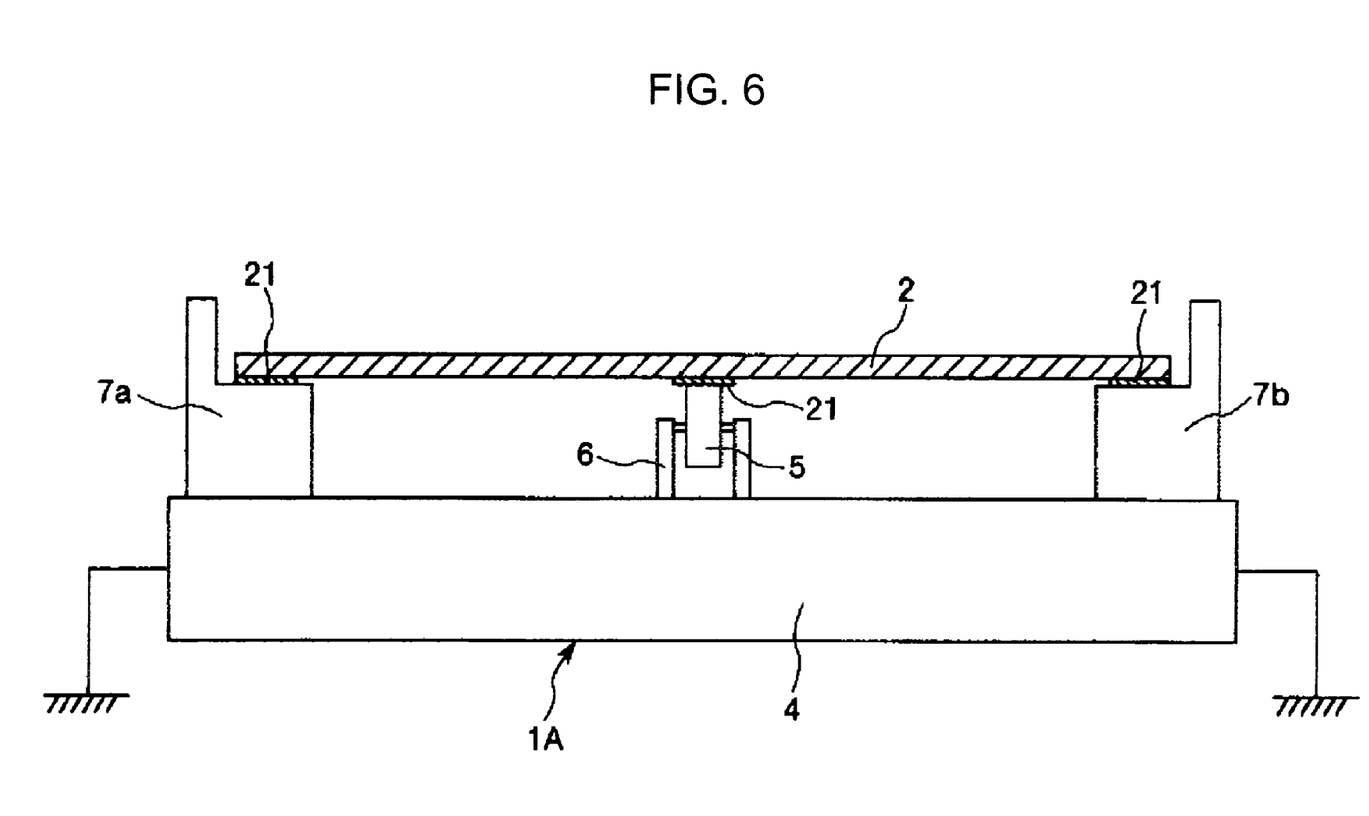
FIG. 6 is a front view illustrating the second embodiment of the substrate carrying apparatus that implements the substrate carrying method of the invention.

FIG. 6 is a front view illustrating the second embodiment of the substrate carrying apparatus that implements the substrate carrying method of the invention. Hereinafter, a second embodiment of the substrate carrying method and the substrate carrying apparatus of the invention will be described with reference to the figure. In the second embodiment, the differences from the above-mentioned embodiment are mainly explained and the same matters will be omitted.

The substrate carrying apparatus 1A shown in FIG. 6 corresponds to an apparatus having the same structure as the substrate carrying apparatus 1 of the first embodiment except for the point that the two rows excepting the central row among the three rows of the rollers 5 of the substrate carrying apparatus 1 are replaced with the guide rail 7a, 7b. In the substrate carrying apparatus 1A, the guide rail 7a, 7b also functions as the substrate supporting unit. When the substrate 2 is carried by the rolling of the rollers 5 in the central raw, both right edge and left edge slide along the guide rail 7a, 7b. Therefore, the substrate 2 is guided so as to go straight toward the carrying direction.

The guide rail 7a, 7b is composed of conductive material such as metal, metal powder, metal compound, carbon black and others, at least in the vicinity of its surface. Furthermore, the part between the main body 4 and the guide rail 7a, 7b is also conductive. Moreover, the main body 4 is grounded. By this configuration, the guide rail 7a, 7b is grounded with the main body 4. According to the substrate carrying apparatus 1A as above, if the substrate 2 during the carriage is charged with electricity, the charge is quickly lost through the conductive layer 21 and the guide rail 7a, 7b, and thus the same effect as the first embodiment can be obtained.

Third Embodiment

Figure 7:
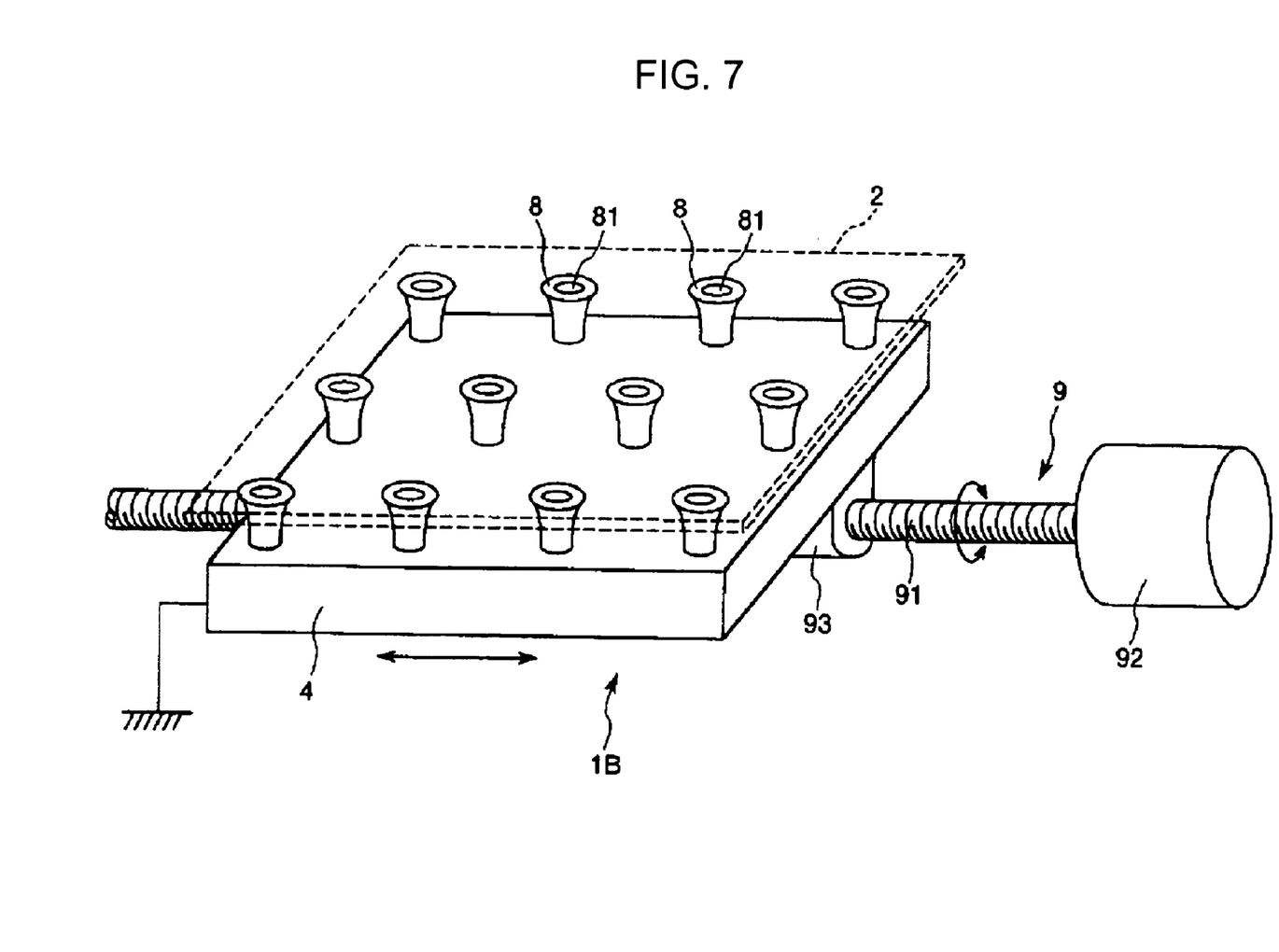
FIG. 7 is a perspective view illustrating the third embodiment of the substrate carrying apparatus that implements the substrate carrying method of the invention.

FIG. 7 is a perspective view illustrating the third embodiment of the substrate carrying apparatus that implements the substrate carrying method of the invention. Hereinafter, a third embodiment of the substrate carrying method and the substrate carrying apparatus of the invention will be described with reference to FIG. 7. In the third embodiment, the differences from the above-mentioned embodiment are mainly explained and the same description will be omitted.

In FIG. 7, the substrate carrying apparatus 1B has the main body 4, the plural attaching parts 8 provided on the main body 4, and the transferring apparatus 9 carrying the main body 4. In the substrate carrying apparatus 1B, the attaching part 8 functions as the substrate supporting unit. The attaching part 8 is provided to protrude from the upper side of the main body 4. On the topside of the attaching part 8, the suction part 81 is formed. Inside the main body 4, a suction passage leading to each the suction part 81, which is not illustrated, is formed, and the suction passage is linked to a vacuum pump, which is not illustrated. The substrate 2 placed on the attaching part 8 is attached by vacuum using the vacuum pump and thus fixed to the main body 4.

The transferring apparatus 9 has a feed screw 91, a motor 92 rotating the feed screw 91, and a screw connection part 93 that is fixed to the main body 4 and connected with the feed screw 91. The feed screw 91 rotates by the drive of the motor 92, and thereby the main body 4 is transferred to the right and left of FIG. 7. By this configuration, the substrate 2 can be transferred. The attaching part 8, at least, is composed of conductive material such as metal, metal powder, metal compound, carbon black and others in the vicinity of its surface. Furthermore, the part between the main body 4 and the attaching part 8 is also conductive. Moreover, the main body 4 is grounded. By this configuration, the attaching part 8 is grounded through the main body 4. According to the substrate carrying apparatus 1B as described above, if the substrate 2 during the carriage is charged with electricity, the charge is quickly lost through the conductive layer 21 and the attaching part 8, and thus the same effect as the first embodiment can be obtained.

Hereinbefore, the illustrated embodiments of the substrate carrying method and the substrate carrying apparatus of the invention are described, but the invention is not limited to these embodiments, and each part constituting the substrate carrying method and the substrate carrying apparatus may be replaced with any constituent that is able to fulfill the same function. Furthermore, any constituent may be added. In addition, the invention may be used in conjunction with other public methods to remove electrical charges. In that case, there are methods as a method used together to remove electrical charges, for example: squirting ionization gas as disclosed in JP-A-5-243187; squirting high-humidity gas in JP-A-7-733991 and JP-A-7-130488; providing electricity neutralization gas from a plurality of holes in JP-A-2001-7187; removing electric charges with electro-polishing solution showers in JP-A-2001-343632; and using soft X-ray in JP-A-2004-311048.

What is claimed is:

1. A substrate carrying method for removing electrical charges on a substrate while the substrate is being transported by a substrate supporting unit, the method comprising:
   providing a substrate supporting unit having three rows of rollers that are parallel to each other;
   determining first and second paths, on opposite edges of a surface of the substrate respectively, through which two rows of the rollers of the substrate supporting unit travel during transportation of the substrate;
   determining a cutting line of the substrate in the middle of the substrate and parallel to each of the first and second paths;

forming only three conductive strips with conductivity on the surface of the substrate to cover the first path, the second path, and the cutting line respectively; and transporting the substrate by the substrate supporting unit, wherein each row of the three rows of rollers of the grounded substrate supporting unit is in contact only with a respective one of the three conductive strips during transportation of the substrate;

cutting the substrate into two pieces along the cutting line.

2. The substrate carrying method according to claim 1, wherein the conductive strips are formed by applying a liquid material on the substrate using a droplet discharging head that discharges the liquid material with conductive particles as droplets, and then by solidifying or hardening the liquid material.

3. The substrate carrying method according to claim 1, wherein the substrate supporting unit comprises an attaching part that attaches on the substrate by vacuum.

4. The substrate carrying method according to claim 1, wherein the substrate supporting unit comprises a guide rail that guides the substrate.

5. The substrate carrying method according to claim 1, wherein the conductive strips are formed along a carrying direction of the substrate.

6. A system, comprising:
  a grounded substrate supporting unit with conductivity having three rows of rollers that are parallel to each other,
  a substrate having only three conductive strips including
    first and second conductive strips with conductivity formed on opposite edges of a surface of the substrate, respectively, and
    a third conductive strip with conductivity formed on a cutting line of the substrate, wherein the cutting line is in the middle of the substrate and is parallel to each of the first and second conductive strips, and
  wherein the substrate is supported by the substrate supporting unit, wherein each of the three rows of rollers of the grounded substrate supporting unit is in contact with a respective one of the first, second, and third conductive strips of the substrate.

7. The substrate carrying apparatus according to claim 6, wherein the substrate supporting unit comprises an attaching part that attaches on the substrate by vacuum.

8. A system, comprising:
  a grounded substrate supporting having first and second guide rails as well as a row of rollers that are between and parallel to the guide rails,
  a substrate having only three conductive strips including
    first and second conductive strips with conductivity formed on opposite edges of a surface of the substrate, respectively, and
    a third conductive strip formed on a cutting line of the substrate, wherein the cutting line is in the middle of the substrate and is parallel to each of the first and second conductive strips, and
  wherein the substrate is supported by the substrate supporting unit, wherein each of the first and second guide rails guides the substrate and is in contact with a respective one of the first and second conductive strips of the substrate, wherein the row of rollers is in contact with the third conductive strip.

* * * * *

UNITED STATES PATENT AND TRADEMARK OFFICE
CERTIFICATE OF CORRECTION

PATENT NO. : 7,608,304 B2
APPLICATION NO. : 11/353457
DATED : October 27, 2009
INVENTOR(S) : Minoru Koyama Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 664 days.

Signed and Sealed this

Twelfth Day of October, 2010

David J. Kappos
*Director of the United States Patent and Trademark Office*